US005936826A

United States Patent [19]

Schmidt

[11] Patent Number: 5,936,826

[45] Date of Patent: Aug. 10, 1999

[54] SURGE ARRESTER

[75] Inventor: Walter Schmidt, Bellikon, Switzerland

[73] Assignee: Asea Brown Boveri AG, Baden, Switzerland

[21] Appl. No.: 09/116,937

[22] Filed: Jul. 17, 1998

[30] Foreign Application Priority Data

Mar. 25, 1998 [DE] Germany .......................... 198 13 135

[51] Int. Cl.[6] .................................................... H02H 1/00

[52] U.S. Cl. .......................................... 361/127; 361/117

[58] Field of Search .................................. 361/111, 117, 361/118, 127, 126

[56] References Cited

U.S. PATENT DOCUMENTS

| | | | |
|---|---|---|---|
| 3,310,766 | 3/1967 | Downing et al. | 361/127 |
| 4,335,417 | 6/1982 | Sakshaug et al. | 361/127 |
| 5,497,138 | 3/1996 | Malpiece et al. | 361/117 |
| 5,517,382 | 5/1996 | Leupp et al. | 361/118 |

FOREIGN PATENT DOCUMENTS

| | | | |
|---|---|---|---|
| 0335479A2 | 1/1989 | European Pat. Off. | H01C 7/12 |
| 0614198A2 | 2/1994 | European Pat. Off. | H01C 7/12 |

*Primary Examiner*—Ronald W. Leja
*Attorney, Agent, or Firm*—Burns, Doane, Swecker & Mathis, L.L.P.

[57] ABSTRACT

The surge arrester has an axially symmetrical active portion (2) arranged between two connection fittings (1, 2). This active portion (2) contains varistor elements (12) stacked one above the other and also an axially symmetrical connecting element (13) of electrically conductive material arranged in the active portion (2) of the arrester between two successive varistor elements (12). At least four mounting places (16, 16'), which are uniformly distributed around the axis in the circumferential direction, are formed in the connecting element (13). Two first (16) of the mounting places support respectively one of two first loops (15) which act with contact force on the connecting element (13) and on the varistor elements (12) abutting the connecting element (13). Two second (16') of the mounting places support respectively one of two second loops (15) which act with contact force on the connecting element (13) and on the varistor elements (12) located under the connecting element. Such a surge arrester can have large constructional heights and is distinguished in addition by good mechanical and electrical properties.

10 Claims, 1 Drawing Sheet

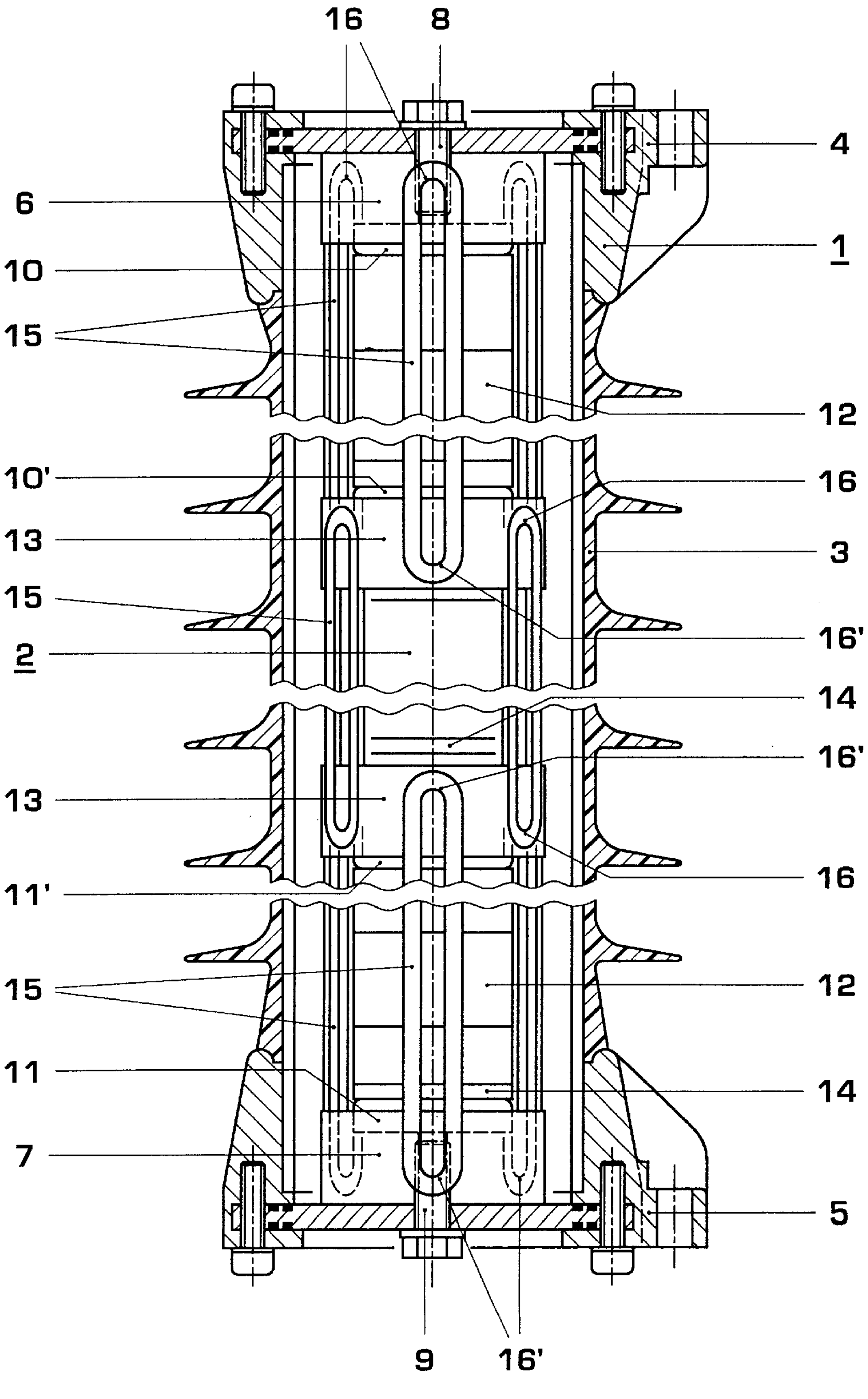
16
8
4
6
1
10
15
12
10'
16
13
3
15
16'
2
14
16'
13
16
11'
15
12
11
14
7
5
9
16'

SURGE ARRESTER

BACKGROUND OF THE INVENTION

1. Field of the Invention

The present invention relates to a surge arrester, and more particularly to a surge arrester including two current-conducting connection fittings separated by an axially symmetrical active portion of the surge arrester.

2. Brief Description of the Related Art

EP 0 614 198 B1 describes a surge arrester containing two connection fittings and a column of varistor elements, stacked one above the other, between the connection fittings. Electrical contact between the connection fittings and the varistor elements is produced by two or more loops of insulating material, the ends of which are respectively mounted in one of the two connection fittings, and thus also act with a contact force on the varistor elements located therebetween.

For large constructional heights, as are for example required for nominal voltages of more than 70 kV, a surge arrester constructed according to EP 0 614 198 B1 is generally not used, as relatively expensive additional measures have to be provided in its manufacture.

A surge arrester is described in EP 0 335 479 B1 which includes a weather protection housing, two connection fittings brought out of the housing, and an active portion of axially symmetrical construction, located in the interior of the housing, arranged between the connection fittings. The active portion is constructed from several cylindrical modules, which are stacked one above the other in the form of a column. Each module has several cylindrical varistor elements whose ends abut along the cylinder axis. Electrical contact between the varistor elements is attained by the substantially axially-directed thread winding which acts with a pre-stressing force on two metallic end portions which bind the module at the ends. The end portions of adjacent modules are electrically connected together by means of a screw bolt.

The production of a surge arrester as described in EP 0 335 479 B1 is relatively expensive, since the modules are produced by thread winding in a first step, and in a succeeding second step the modules are then joined together by screwing adjacent end portions of the modules, with the formation of a connecting portion having good electrical conductivity.

SUMMARY OF THE INVENTION

According to an exemplary embodiment of the present invention, a surge arrester comprises two current-conducting connection fittings spaced apart along an axis, an axially symmetrical active portion arranged between the two connection fittings and containing cylindrical varistor elements stacked one above the other, a housing which receives the active portion, a mounting having loops and acting on the active portion with contact force, and wherein the active portion comprises at least one electrically conductive, axially symmetrical connecting element, the connecting element being arranged between two successive varistor elements in the stack and has at least four mounting places which are formed in or on the connecting element and are uniformly distributed in the circumferential direction around the axis, a first two loops being supported on a first two of the mounting places and acts with a first contact force on the connecting element and a first two varistor elements, and that a second two loops being supported on a second two of the mounting places and acts with a second contact force on the connecting element and a second of the two varistor elements.

One object of the present invention is to provide a surge arrester which can be produced with a large constructional height in a simple and cost-efficient manner.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which:

FIG. 1 is a side elevational view, in cross section, of a surge arrester according to one embodiment of the present invention, wherein the axially symmetrical housing the surge arrester is illustrated.

DESCRIPTION OF THE PREFERRED EMBODIMENTS

Referring to the drawing figures, like reference numerals designate identical or corresponding elements throughout the several figures.

The surge arrester according to the present invention is distinguished from prior surge arresters in that it can be made practically with optional constructional height in a simple and economical manner. There is additionally built into the active portion of the surge arrester only, at least one connecting element, which is arranged between two successive varistor elements, and is of electrically conducting material with suitably constructed and arranged mounting places. Loops held on the mounting places are passed in opposite directions and are fixed to mounting places of the connection fittings or of a further connecting element or of two further connecting elements, with the production of contact force. Hence, for its mounting, substantially only one of the prefabricated templates is necessary which have already proved to be effective in the state of the art in the manufacture of surge arresters, and which principally insure axial guiding, and in which the connection fittings, the varistor elements, and also, according to the diameter of the varistor elements and the constructional height, one or more of the connecting elements, are stacked, and are thereafter connected together into the mechanically stable active portion of the surge arrester by the installation of the loops and application of prestress.

During stacking, the mechanical stability of the active portion can be attained by successive bracing of succeeding partial stacks, the pre-stress force being attained by clamping devices integrated into the fittings and/or the connection elements, or else by spring elements which are built into the stack formed in the template and which, on installation of the loops, provide the desired contact force and thereby also the required mechanical stability.

An additional clamping device, or additional spring elements, can be saved if the loops are respectively formed by an elastically deformable strip, possibly of glass fibers.

Four loops mounted on the connecting element are sufficient in general for good mechanical stability of the active portion; for example, two of them are arranged diametrally of each other, and are directed in the opposite direction to the other two loops. Increased stability is achieved by the use of six mounting places, arranged offset by about 60° in the circumferential direction and, of which, respectively, three serve to guide the loops in a predetermined first direction and three in the opposite direction. Stability is improved only a little by eight or more mounting places, and this requires, however, an additional production-technical expense. Loops which are directed opposingly on a connection piece can also be arranged without any offset in the circumferential direction and solely offset in the axial direction. If necessary, the connection piece can be formed by two parts which can be connected together so that they can be released or can be mutually separated, and which respectively carry loops which are aligned solely in one direction.

Turning now to the drawing figure, FIG. 1 illustrates a surge arrester according to one embodiment of the present invention. The surge arrester has a housing 1 of an axially symmetrical form, and a surge arrester active portion 2, of axially symmetrical construction, is arranged in it along the housing axis (not shown). The housing is constructed of an insulating tube 3 provided with screens and made of a weather-resistant material, for example a polymeric material such as a silicone, or a porcelain, and two metallic connection fittings 4 and 5 which are attached to the ends of the tube of insulating material. The connection fittings 4 and 5 respectively have a metal plate (not shown, for clarity) which gas-tightly closes the housing 1, and also a respective cylindrical closure portion 6 or 7, which is arranged with axial symmetry in the interior of the housing 1, and which respectively seals the active portion 2 of the arrester, upward or downward. A bore provided with an internal thread is let into the closure part 6 or 7. A pressure screw 8 or 9, brought outward along the housing axis through the plate of the connection fitting, cooperates with the internal thread. The foot of the pressure screw 8 or 9 is mounted on a metal pressure plate 10 or 11, which is axially displaceable in a recess of the closure portion 6 or 7, of the active portion 2 of the surge arrester.

The active portion of the arrester is constructed as a stack and also contains, besides the two closure portions 6 and 7, cylindrical varistor elements 12 of nonlinear resistance material, which may have a metal oxide basis, such as ZnO in particular, and cylindrically embodied metallic connecting elements 13. There are further provided in the active portion of the arrester 2 further pressure plates 10', 11', and also disk-shaped ohmic contact elements 14, which can be arranged between a pressure plate 10, 10', 11, 11' and an adjacent varistor element 12; between adjacent varistor elements 12; and between a connecting element 13 and a varistor element 12 or a pressure plate.

Loops of insulating material are denoted by the reference symbol 15; they are preferably formed of a wound, fiber-reinforced strip which is embedded in a polymer matrix and, with the production of contact force, brace two connecting elements 13, or brace the closure portion 6 and the connecting element 13 adjoined to the portion 6 in the active portion 2 of the surge arrester, or brace the closure portion 7 and the connecting element 13 adjoined to the portion 7 in the active portion 2 of the surge arrester. The loops 15 have their ends guided in grooves 16, 16' which are formed in the envelope surfaces of the closure portions 6, 7 and of the connecting elements 13. The closure portions 6, 7 or the connecting elements 13 project beyond the pressure plates 10, 10', 11, 11' and the varistor elements 12 in the radial direction. The loops 15 mounted in the grooves 16, 16' thus have, in a dielectrically favorable manner, a defined distance from the varistor elements 12. An analogous guiding of the loops can be attained if the closure portions 6, 7 and the connecting elements 13 in fact have the same diameter as the varistor elements 12, but now have, instead of the grooves, radially directed projections on which the loops 15 are mounted.

Each of the two connecting elements 13 has six grooves 16, 16', which are arranged mutually offset, respectively by about 60°, in the circumferential direction. These grooves all have a semicircular section which is open in the axial direction, and in which an end of one of the loops 15 is mounted. Adjoining the semicircular section are two sections which predominantly pass in the axial direction and in which is held a portion of a respective loop section which runs straight and adjoins the end of the mounted loop. This section runs parallel, and at a predetermined, dielectrically favorable distance, to the varistor elements which are acted on with contact force by the mounted loop.

The sections of the grooves 16 which run straight, run oppositely to the corresponding sections of the grooves 16'. A respective one of three loops is supported in the groove 16' and braces together, with the production of contact force, the connecting element 13 and the closure portion 6 and also the varistor elements arranged between them. The magnitude of the contact force is set during mounting of the surge arrester by turning the pressure screw 8 and by axial displacement of the pressure plate 10 thereby. A respective one of three loops is supported in the groove 16, and braces the two connecting elements 13 and the varistor elements arranged therebetween, with the production of contact force. The contact force is attained here by elastically deformable loops, and if desired can be varied in magnitude by means of a clamping device, with a pressure screw and a clamping plate, which can be built into the connecting element 13. A further, second clamping element can if necessary be built into the connecting element 13, and acts on the section lying thereabove of the active portion 2 of the arrester. The clamping screw 8 and pressure plate 10 can then be dispensed with.

The grooves 16 and 16' follow each other alternately in the circumferential direction of the connecting elements 13. The pre-stress force taken up by the loops is thus uniformly transmitted to the varistor elements 12.

For the production of this surge arrester, there are stacked one above the other in a template, the closure portion 7, the pressure plate 11, the ohmic contact element 14, alternately further ohmic contact elements and varistor elements 12, the pressure plate 11', and the lower connecting element 13. The grooves 16' of the closure portion 7 and grooves 16 of the connecting element 13 are here set so that they are mutually aligned. Three prefabricated loops 15, which preferably respectively consist of a wound, stripform prepreg which is hardened after winding, are suspended in the mutually aligned grooves 16, 16', and by the rotation of the pressure screws 9, force is exerted on the pressure plate 11 and thus, via the loops 15 which span them, also on all the varistor elements of the active portion of the arrester which are arranged between the parts 7 and 13.

Further varistor elements 12 and ohmic contact elements are now correspondingly stacked on the connecting element 13, and this partial stack is concluded with the further connecting element 13. This partial stack of the active portion of the arrester can be braced with loops which are respectively produced, during the production of the surge arrester, by winding a strip which is acted on by pre-stress force and is laid in the mutually aligned grooves 16 and 16'.

In a corresponding manner, the active portion of the arrester can be extended by further partial stacks, and can finally be concluded by the closure portion 6. The active portion can now be placed in the housing 1, which can be closed after filling with a settable insulating medium. Since the loops are applied at a distance from the varistor elements 12 here, the insulating medium encloses the active portion with high reliability, free from gaps and shrink holes. The surge arrester according to the invention thus has, in spite of the optional constructional height, not only good mechanical properties but also good electrical properties.

The housing does not necessarily have to contain insulating material; it can also be metallic. Additional potential-controlling means are then to be provided between the housing wall and the active portion of the arrester, and feedthroughs are to be provided at the ends of the housing.

While the invention has been described in detail with reference to preferred embodiments thereof, it will be apparent to one skilled in the art that various changes can be made, and equivalents employed, without departing from the scope of the invention.

What is claimed is:

1. A surge arrester comprising:

two current-conducting connection fittings spaced apart along an axis;

an axially symmetrical active portion arranged between the two connection fittings and containing cylindrical varistor elements stacked one above the other;

a housing which receives the active portion; and loops acting on the active portion with contact force;

wherein the active portion comprises at least one electrically conductive, axially symmetrical connecting element;

wherein the at least one connecting element is arranged between two successive varistor elements in the stack;

at least four mounting places for said loops uniformly distributed in the circumferential direction around the axis on the at least one connecting element;

wherein each of a first two loops is supported on a first two of the mounting places on said connecting element and acts with a first contact force on the connecting element and a first of the two varistor elements;

wherein each of a second two loops is supported on a second two of the mounting places on the connecting element and acts with a second contact force on the connecting element and a second of the two varistor elements; and wherein each of the first mounting places is arranged between two of the second mounting places.

2. A surge arrester according to claim 1, wherein the connecting element contains a clamping device which produces at least one of the first and the second contact force.

3. A surge arrester according to claim 1, wherein the connecting element includes a projecting section which projects beyond the varistor elements in a radial direction, and further comprising grooves forming the mounting places which are formed in the projecting section.

4. A surge arrester according to claim 3, wherein the grooves have a semicircular section which is open in the axial direction and in which one end of the first or second loop is mounted.

5. A surge arrester according to claim 4, further comprising sections adjoining the semicircular section and which are predominantly directed in the axial direction and in which is mounted a portion of a loop section running in a straight line, adjoining the end of the loop, and which runs parallel and at a predetermined distance from the varistor elements on which the loop acts with contact force.

6. A surge arrester according to claim 5, wherein the predominantly axially directed sections of circumferentially adjacent grooves extend in opposite directions.

7. A surge arrester according to claim 1, wherein the connecting element further comprises six grooves which are mutually offset from each other by about 60° in the circumferential direction.

8. A surge arrester according to claim 1, wherein said at least four mounting places comprises at least four pairs of mounting places for said loops, a first mounting place of each pair of mounting places being one of said at least four mounting places.

9. A surge arrester according to claim 8, wherein said at least one connecting element comprises a first connecting element and a second connecting element, and wherein a second mounting place of each pair of said at least four pairs of mounting places is located on a portion of the surge arrester selected from the group consisting of one of the two current-conducting connection fittings and the second connecting element.

10. A surge arrester according to claim 8, wherein a second mounting place of each pair of said at least four pairs of mounting places is located on one of the two currentconducting connection fittings.

* * * * *